United States Patent
Levy

(10) Patent No.: US 10,628,591 B2
(45) Date of Patent: Apr. 21, 2020

(54) METHOD FOR FAST AND EFFICIENT DISCOVERY OF DATA ASSETS

(71) Applicant: Forcepoint, LLC, Austin, TX (US)

(72) Inventor: Eyal Levy, Holon (IL)

(73) Assignee: Forcepoint LLC, Austin, TX (US)

( * ) Notice: Subject to any disclaimer, the term of this patent is extended or adjusted under 35 U.S.C. 154(b) by 158 days.

(21) Appl. No.: 15/817,846

(22) Filed: Nov. 20, 2017

(65) Prior Publication Data
US 2019/0156041 A1    May 23, 2019

(51) Int. Cl.
*G06F 21/57*    (2013.01)

(52) U.S. Cl.
CPC .................... *G06F 21/577* (2013.01)

(58) Field of Classification Search
CPC .... G06F 21/577; H04L 63/1408; H04L 63/20
See application file for complete search history.

(56) References Cited

U.S. PATENT DOCUMENTS

| | | | | |
|---|---|---|---|---|
| 6,907,531 B1* | 6/2005 | Dodd | .................... | G06F 21/577 709/224 |
| 7,574,740 B1* | 8/2009 | Kennis | ................ | H04L 63/1416 713/151 |
| 7,882,538 B1* | 2/2011 | Palmer | .................... | G06F 21/31 713/150 |
| 8,230,505 B1* | 7/2012 | Ahrens | ................. | G06Q 10/02 726/23 |
| 2002/0078382 A1* | 6/2002 | Sheikh | ................ | H04L 41/0866 726/22 |
| 2003/0145225 A1* | 7/2003 | Bruton, III | .......... | H04L 63/1408 726/23 |
| 2003/0145226 A1* | 7/2003 | Bruton, III | .......... | H04L 63/0263 726/22 |
| 2003/0188189 A1* | 10/2003 | Desai | .................... | H04L 63/104 726/23 |
| 2005/0138402 A1* | 6/2005 | Yoon | ....................... | G06F 21/55 713/193 |
| 2006/0085543 A1* | 4/2006 | Hrastar | ............... | H04L 63/1408 709/224 |
| 2008/0082722 A1* | 4/2008 | Savagaonkar | .......... | G06F 21/56 711/6 |

(Continued)

OTHER PUBLICATIONS symantec.com, Which tuning is available for improving the performance of Symantec Endpoint Protection clients during scan, https://support.symantec.com/en_US/article_TECH143941.html, Jan. 6, 2011.

(Continued)

*Primary Examiner* — J. Brant Murphy
(74) *Attorney, Agent, or Firm* — Terrile, Cannatti & Chambers; Stephen A. Terrile

(57) ABSTRACT

A method, system and computer-usable medium for performing a data asset discovery security operation, comprising: capturing a stream of data resulting from interactions between a user and a device; identifying an occurrence of a data asset discovery operation in the stream of data; generating a data asset index corresponding to a data asset associated with the occurrence of the data asset discovery operation; and, determining whether a data asset security policy is applicable to the data asset associated with the occurrence of the data asset discovery operation.

20 Claims, 5 Drawing Sheets

(56) References Cited

U.S. PATENT DOCUMENTS

| | | | |
|---|---|---|---|
| 2009/0249466 A1* | 10/2009 | Motil | H04L 63/0245 726/12 |
| 2009/0254572 A1* | 10/2009 | Redlich | G06Q 10/06 |
| 2010/0010968 A1* | 1/2010 | Redlich | G06Q 10/00 707/E17.014 |
| 2013/0080641 A1* | 3/2013 | Lui | H04L 67/10 709/226 |
| 2013/0231084 A1* | 9/2013 | Raleigh | G06Q 10/06375 455/408 |
| 2013/0269029 A1* | 10/2013 | Nakawatase | H04L 63/16 726/22 |
| 2013/0275574 A1* | 10/2013 | Hugard, IV | H04L 41/12 709/224 |
| 2013/0298192 A1* | 11/2013 | Kumar | G06F 21/52 726/3 |
| 2014/0298468 A1* | 10/2014 | Yamamura | G06F 21/552 726/23 |
| 2015/0066896 A1* | 3/2015 | Davis | G06F 16/9038 707/710 |
| 2015/0135255 A1* | 5/2015 | Theimer | H04L 63/20 726/1 |
| 2016/0042179 A1* | 2/2016 | Weingarten | G06F 21/566 726/23 |
| 2016/0055334 A1* | 2/2016 | Herwono | G06F 21/554 726/23 |
| 2017/0126718 A1* | 5/2017 | Baradaran | H04L 63/1425 |
| 2017/0149795 A1* | 5/2017 | Day, II | H04W 4/02 |
| 2017/0214705 A1* | 7/2017 | Gupta | G06F 21/577 |
| 2017/0214717 A1* | 7/2017 | Bush | H04L 63/107 |
| 2017/0244729 A1* | 8/2017 | Fahrny | G06F 12/1458 |

OTHER PUBLICATIONS microsoft.com, Windows Search Overview, https://msdn.microsoft.com/en-us/library/windows/desktop/aa965362, printed Nov. 20, 2017.

SANS ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS ONE 12(2): e0170579, 2017.

* cited by examiner

METHOD FOR FAST AND EFFICIENT DISCOVERY OF DATA ASSETS

BACKGROUND OF THE INVENTION

Field of the Invention

The present invention relates in general to the field of computers and similar technologies, and in particular to software utilized in this field. Still more particularly, it relates to a method, system and computer-usable medium for assessing the risk corresponding to the occurrence of a data asset discovery operation.

Description of the Related Art

Users interact with physical, system, data, and services resources of all kinds, as well as each other, on a daily basis. Each of these interactions, whether accidental or intended, poses some degree of security risk. However, physical and cyber security efforts have traditionally been oriented towards preventing or circumventing the intent of external threats.

More particularly, physical security approaches have typically focused on monitoring and restricting access to tangible resources. Likewise, cyber security approaches have included network access controls, intrusion detection and prevention systems, machine learning, big data analysis, software patch management, and secured routers. Accordingly, such approaches are generally more oriented to security administration than risk adaptation. As a result, the traditional focus of physical and cyber security has been on enforcing policies for compliance, privacy, and the protection of intellectual property (IP).

However, not all user behavior poses the same risk. For example, one user's access of an organization's proprietary resources may pose a higher risk than another user accessing the same resource. Likewise, an authorized user modifying a particular data asset may pose less risk than an unauthorized user retrieving, viewing and transferring the same data asset to yet another user. Consequently, applying the same policy to all user behavior instead of adaptively adjusting security oversight according to a user's role and the value of the data asset being accessed may result in a sub-optimal security response.

SUMMARY OF THE INVENTION

A method, system and computer-usable medium are disclosed for assessing risk corresponding to occurrence of a data asset discovery operation. In various embodiments, a method, system and computer-usable medium are disclosed for performing a data asset discovery security operation, comprising: capturing a stream of data resulting from interactions between a user and a device; identifying an occurrence of a data asset discovery operation in the stream of data; generating a data asset index corresponding to a data asset associated with the occurrence of the data asset discovery operation; and, determining whether a data asset security policy is applicable to the data asset associated with the occurrence of the data asset discovery operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for assessing the risk corresponding to the occurrence of a data asset discovery operation. Certain embodiments of the invention reflect an appreciation that lack of accurate identification and classification of sensitive data assets, wherever they may be located, whenever they may be used and by whom, for whatever purpose, can limit the effectiveness of content-aware security approaches. Likewise, certain embodiments of the invention reflect an appreciation that accurate identification and classification of sensitive assets, on a frequent basis and ideally in near real-time, whenever such data assets are created, accessed, or modified, can assist the effectiveness of content-aware security.

Certain embodiments of the invention reflect an appreciation that known content-aware security approaches include methodically crawling through file systems and performing in-depth scanning of each file they contain. Likewise, such operations may be performed on a scheduled basis, typically at idle time or during non-working hours in order to reduce user impact. Furthermore, mobile devices may be deactivated and unavailable when these operations are performed, which reduces their effectiveness. Accordingly, such approaches may not only be laborious and time-consuming, but may also result in inefficient use of system resources, ineffective data asset security, and unsatisfactory user experience.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

Figure 1:
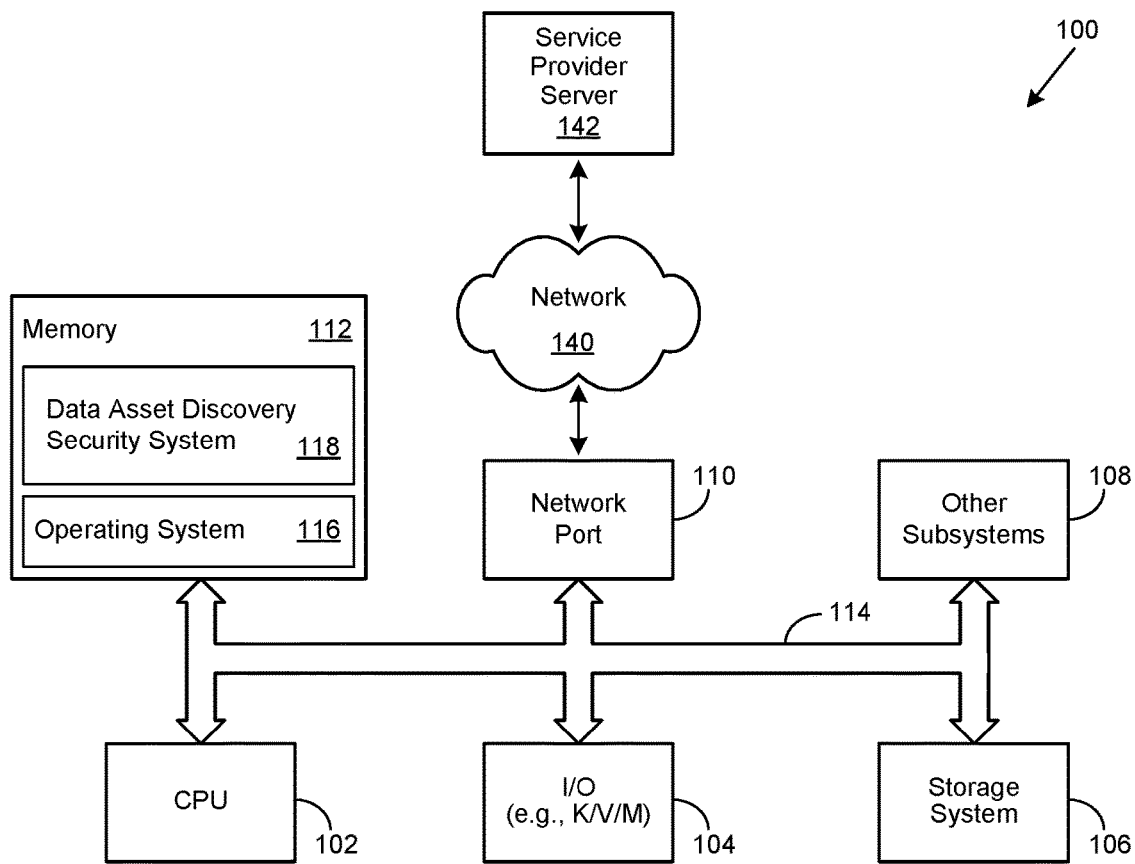
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a data asset discovery security system 118. In one embodiment, the information handling system 100 is able to download the data asset discovery security system 118 from the service provider server 142. In another embodiment, the data asset discovery security system 118 is provided as a service from the service provider server 142.

In various embodiments, the data asset discovery security system 118 performs a data asset discovery security operation. In certain embodiments, the data asset discovery security operation improves processor efficiency, and thus the efficiency of the information handling system 100, by automatically performing the data asset discovery security operation. As will be appreciated, once the information handling system 100 is configured to perform the data asset discovery security operation, the information handling system 100 becomes a specialized computing device specifically configured to perform the data asset discovery security operation and is not a general purpose computing device. Moreover, the implementation of the data asset discovery security system 118 on the information handling system 100 improves the functionality of the information handling system 100 and provides a useful and concrete result of data asset discovery security.

Figure 2:
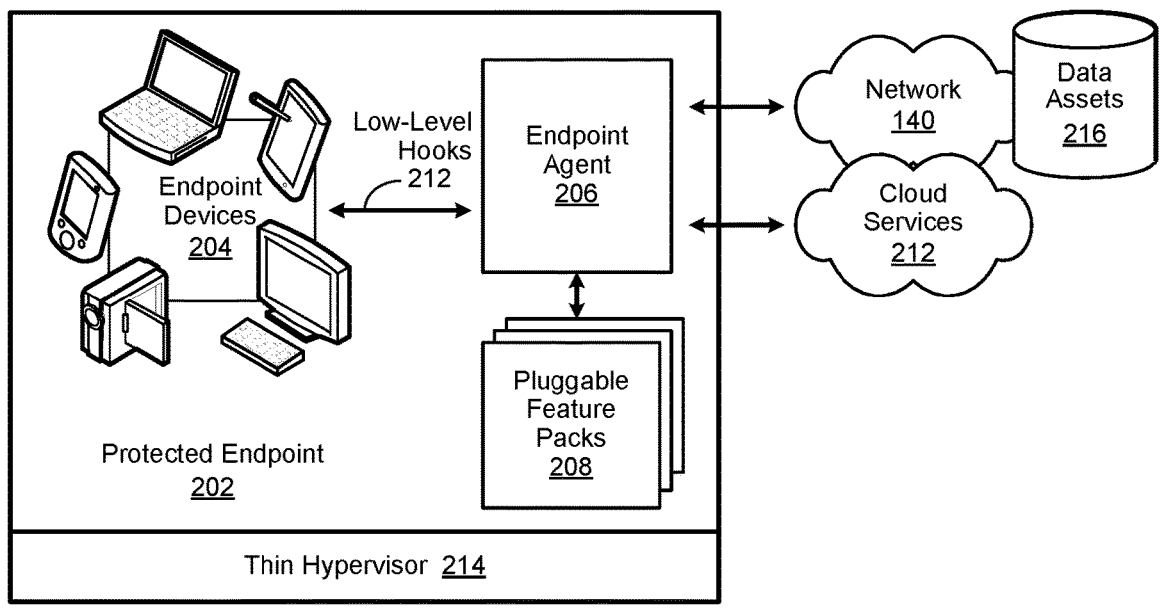
FIG. 2 is a simplified block diagram of a protected endpoint.

FIG. 2 is a simplified block diagram of an endpoint agent implemented in accordance with an embodiment of the invention. As used herein, an endpoint agent 206 broadly refers to a software agent used in combination with an endpoint device 204 to establish a protected endpoint 202. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide whether a particular action is appropriate for a given event. In certain embodiments, such an event may include electronically-observable user behavior, the occurrence of a data asset discovery operation, or a combination thereof.

As used herein, electronically-observable user behavior broadly refers to any behavior exhibited or enacted by a user that can be detected through the implementation of an electronic device, a system, a network, or a combination thereof. In certain embodiments, the electronically-observable user behavior may include cyber behavior. As likewise used herein, cyber behavior broadly refers to any behavior occurring in cyberspace, whether enacted by an individual user, a group of users, an entity, or a system acting at the behest of an individual user, a group of users, or an entity. More particularly, cyber behavior may include physical, social, or mental actions that can be objectively observed, or indirectly inferred, within cyberspace.

As an example, a user may use an endpoint device 204 to access a particular cloud service 212 via a network 140. In this example, the individual actions performed by the user to access the cloud service 212 via the network 140 may constitute one or more cyber behaviors. As another example, a user may use a certain endpoint device 204 via the network 140 to access a data asset 216. In this example, the individual actions performed by the user to access the data asset 216 constitute a cyber behavior. In these examples, the actions are enacted within cyberspace, which make them electronically-observable.

Cyberspace, as likewise used herein, broadly refers to a network 140 environment capable of supporting communication between two or more entities. In various embodiments, the entity may be a user, an endpoint device 204, a system, or various resources described in greater detail herein. In certain embodiments, the entities may include various endpoint devices 204, systems or resources operating at the behest of an entity, such as a user or an organization. In various embodiments, the communication between the entities may include audio, image, video, text, or binary data.

As likewise used herein, an endpoint device 204 broadly refers to an information processing system such as a personal computer, a laptop computer, a tablet computer, a personal digital assistant (PDA), a smart phone, a mobile telephone, a digital camera, a video camera, or other device that is capable of storing, processing and communicating data. In certain embodiments, the data may be communicated through the use of a network 140. In certain embodiments, the communication of the data may take place in real-time or near-real-time.

As an example, a cellular phone conversation may be used to communicate information in real-time, while an instant message (IM) exchange may be used to communicate information in near-real-time. In certain embodiments, the communication of the information may take place asynchronously. For example, an email message may be stored on an endpoint device 204 when it is offline. In this example, the information may be communicated to its intended recipient once the endpoint device 204 gains access to a network 140.

A data asset 216, as likewise used herein, broadly refers to anything that exists in a binary format and has an associated right to use. In certain embodiments, data assets 216 may be centralized, distributed, or locally stored on a user device, such as an endpoint device 204. As likewise used herein, data asset discovery broadly refers to operations associated with accessing, retrieving, consolidating, processing, navigating and analyzing information contained in various data assets 216 to identify patterns, trends, relationships, outliers and anomalies. In certain embodiments, such data asset discovery operations may include creating, searching, transferring, reading, writing, modifying, protecting, or storing a data asset 216. In certain embodiments, data asset discovery operations may be performed by a user, a process, a device, a system, or a combination thereof.

In certain embodiments, data asset discovery operations may likewise include the performance of search indexing operations familiar to those of skill in the art, on a target data asset 216 to generate an associated data asset index. In certain embodiments, the data asset index may be appended to the end of the data asset 216. In certain embodiments, a data asset index may be stored in a separate file, which is in turn indexed to its corresponding data asset 216.

In certain embodiments, a first data asset index is generated when the data asset 216 is created. In certain embodiments, a subsequent data asset index is generated whenever a data asset 216 is accessed to perform a data asset discovery operation. In certain embodiments, a first data asset index associated with a target data asset 216 prior to the performance of a particular data asset discovery operation is compared to a second data asset index generated after the performance of the operation. In certain embodiments, a difference between the first and second data asset index may indicate an unauthorized or suspicious use of the data asset 216.

As likewise used herein, a protected endpoint 202 broadly refers to a policy-based approach to network security that typically requires endpoint devices 204 to comply with particular criteria when accessing network resources, such as a data asset 216. As an example, a given endpoint device 204 may be required to have a particular operating system (OS), or version thereof, a Virtual Private Network (VPN) client, anti-virus software with current updates, and so forth. In certain embodiments, the protected endpoint 202 may be implemented to perform data asset discovery operations, described in greater detail herein.

In certain embodiments, the endpoint agent 206 may be implemented to universally support a variety of operating systems, such as Apple Macintosh®, Microsoft Windows®, Linux®, and so forth. In certain embodiments, the endpoint agent 206 may interact with the endpoint device 204 through the use of low-level hooks 212 at the OS level. It will be appreciated that the use of low-level hooks 212 allows the endpoint agent 206 to subscribe to multiple events through a single hook. Accordingly, multiple functionalities provided by the endpoint agent 206 can share a single data stream, using only those portions of the data stream they may individually need. Accordingly, system efficiency can be improved and operational overhead reduced.

In various embodiments, the endpoint agent 206 may provide a common infrastructure for pluggable feature packs 208. In certain embodiments, the pluggable feature packs 208 may provide certain security management functionalities. Examples of such functionalities may include various anti-virus and malware detection, data loss prevention (DLP), insider threat detection, and so forth. In certain embodiments, the security management functionalities may include one or more data asset discovery functionalities, described in greater detail herein.

In certain embodiments, a particular pluggable feature pack 208 may be invoked as needed by the endpoint agent 206 to provide a given data asset discovery functionality. In certain embodiments, individual features of a particular pluggable feature pack 208 may be invoked as needed. It will be appreciated that the ability to invoke individual features of a pluggable feature pack 208, without necessarily invoking all such features, will likely improve the operational efficiency of the endpoint agent 206 while simultaneously reducing operational overhead. Accordingly, the endpoint agent 206 can self-optimize in certain embodiments by using the common infrastructure and invoking only those pluggable components that are applicable or needed for a given data asset discovery operation.

In certain embodiments, individual features of a pluggable feature pack 208 may be invoked by the endpoint agent 206 according to the occurrence of a particular user behavior. In certain embodiments, the individual features of a pluggable feature pack 208 may be invoked by the endpoint agent 206 according to the context of a particular user behavior. As an example, the context may be the user enacting the user behavior, their associated risk classification, which resource or data asset 216 they may be requesting, and so forth. In certain embodiments, the pluggable feature packs 208 may be sourced from various cloud services 212. In certain embodiments, the pluggable feature packs 208 may be dynamically sourced from various cloud services 212 by the endpoint agent 206 on an as-need basis.

In certain embodiments, the endpoint agent 206 may be implemented with a thin hypervisor 214, which can be run at Ring-1, thereby providing protection for the data endpoint agent 206 in the event of a breach. As used herein, a thin hypervisor broadly refers to a simplified, OS-dependent hypervisor implemented to increase security. As likewise used herein, Ring-1 broadly refers to approaches allowing guest operating systems to run Ring 0 (i.e., kernel) operations without affecting other guests or the host OS. Those of skill in the art will recognize that many such embodiments are possible. Accordingly, the foregoing is not intended to limit the spirit, scope or intent of the invention.

Figure 3:
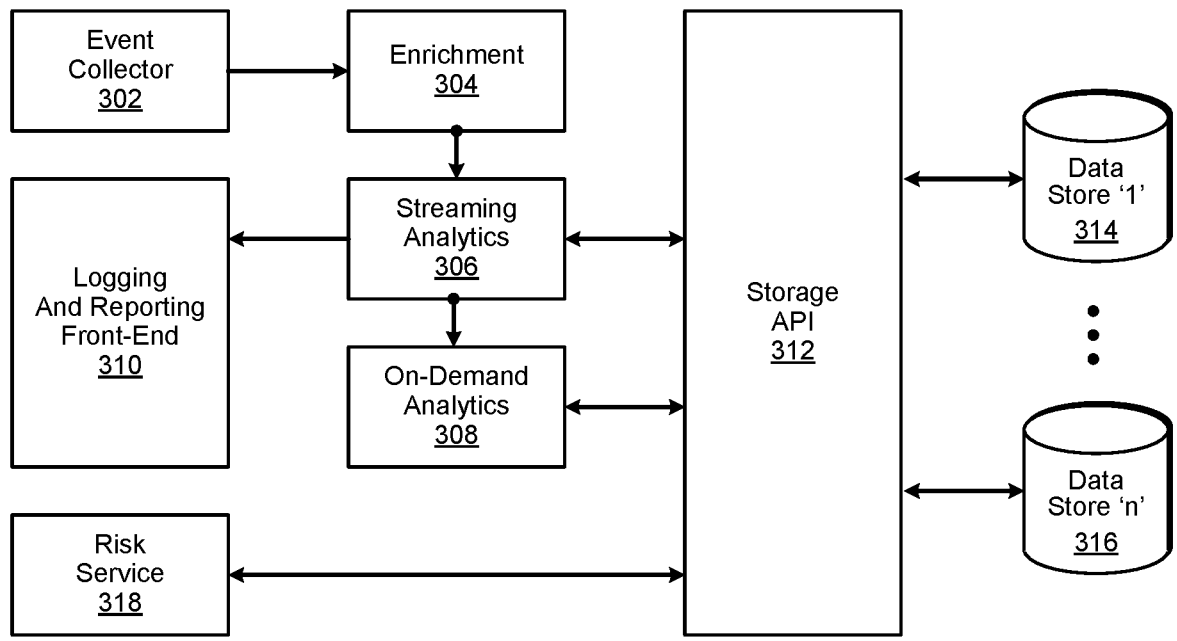
FIG. 3 is a simplified block diagram of a security analytics system.

FIG. 3 is a simplified block diagram of a security analytics system implemented in accordance with an embodiment of the invention. In certain embodiments, the security analytics system shown in FIG. 3 may be implemented to provide log storage, reporting, and analytics capable of performing streaming 306 and on-demand 308 analytics operations. In various embodiments, certain streaming 306 and on-demand 308 analytics operations may be used in the performance of data asset discovery operations, described in greater detail herein.

In certain embodiments, the security analytics system is implemented to provide a uniform platform for storing events and contextual information associated with various user behaviors and performing longitudinal analytics. As used herein, longitudinal analytics broadly refers to performing analytics of user behaviors occurring over a particular period of time. As an example, a user may iteratively attempt to access certain proprietary information, such as a data asset, stored in various locations. In addition, the attempts may occur over a brief period of time. To continue the example, the fact that the information the user is attempting to access is proprietary, that it is stored in various locations, and the attempts are occurring in a brief period of time, in combination, may indicate the user behavior enacted by the user is suspicious.

In certain embodiments, the security analytics system may be implemented to be scalable. In one embodiment, the security analytics system may be implemented in a centralized location, such as a corporate data center. In this embodiment, additional resources may be added to the security analytics system as needs grow. In another embodiment, the security analytics system may be implemented as a distributed system. In this embodiment, the security analytics system may span multiple information processing systems.

In yet another embodiment, the security analytics system may be implemented in a cloud environment. In yet still another embodiment, the security analytics system may be implemented in a virtual machine (VM) environment. In such an embodiment, the VM environment may be configured to dynamically and seamlessly scale the security analytics system as needed. Skilled practitioners of the art will recognize that many such embodiments are possible. Accordingly, the foregoing is not intended to limit the spirit, scope or intent of the invention.

In certain embodiments, an event collector 302 may be implemented to collect event and contextual information, described in greater detail herein, associated with various user behaviors. In these embodiments, the event and contextual information collected by the event collector 302, as described in greater detail herein, is a matter of design choice. In certain embodiments, the event and contextual information collected by the event collector 302 may be processed by an enrichment module 304 to generate enriched user behavior information. In certain embodiments, the enrichment may include certain contextual information related to a particular user behavior.

In certain embodiments, enriched user behavior information may be provided by the enrichment module 304 to a streaming 306 analytics module. In turn, the streaming 306 analytics module may provide some or all of the enriched user behavior information to an on-demand 308 analytics module. As used herein, streaming 306 analytics broadly refers to analytics performed in near-real-time on enriched user behavior information as it is received. Likewise, on-demand 308 analytics broadly refers herein to analytics performed, as it is requested, on enriched user behavior information after it has been received.

In one embodiment, the on-demand 308 analytics may be performed on enriched user behavior associated with a particular interval of time. In another embodiment, the streaming 306 or on-demand 308 analytics may be performed on enriched user behavior associated with a particular user, group of users, one or more entities, or a combination thereof. In yet another embodiment, the streaming 306 or on-demand 308 analytics may be performed on enriched user behavior associated with a particular resource, such as a facility, system, data asset, data store, or service. Those of skill in the art will recognize that many such embodiments are possible. Accordingly, the foregoing is not intended to limit the spirit, scope or intent of the invention.

In certain embodiments, the results of various analytics operations performed by the streaming 306 or on-demand 308 analytics modules may be provided to a storage Application Program Interface (API) 312. In turn, the storage API 312 may provide access to various data stores '1' 314 through 'n' 316, which are used to store the results of the analytics operations. In certain embodiments, the security analytics system may be implemented with a logging and reporting front-end 310, which is used to receive the results of analytics operations performed by the streaming 306 analytics module.

In certain embodiments, the security analytics system may be implemented to provide a risk management service 318. In certain embodiments, the risk management service 318 may be implemented to assess the risk associated with a particular data asset discovery operation, described in greater detail herein, as a service. In certain embodiments, the risk management service 318 may be implemented to provide enhanced cyber behavior information as a service.

In certain embodiments, the risk management service 318 may be implemented to provide the results of various analytics operations performed by the streaming 306 or on-demand 308 analytics modules. In certain embodiments, the risk management service 318 may be implemented to use the storage API 312 to access various enhanced cyber behavior and analytics information stored in the data stores '1' 314 through 'n' 316. Skilled practitioners of the art will recognize that many such embodiments are possible. Accordingly, the foregoing is not intended to limit the spirit, scope or intent of the invention.

Figure 4:
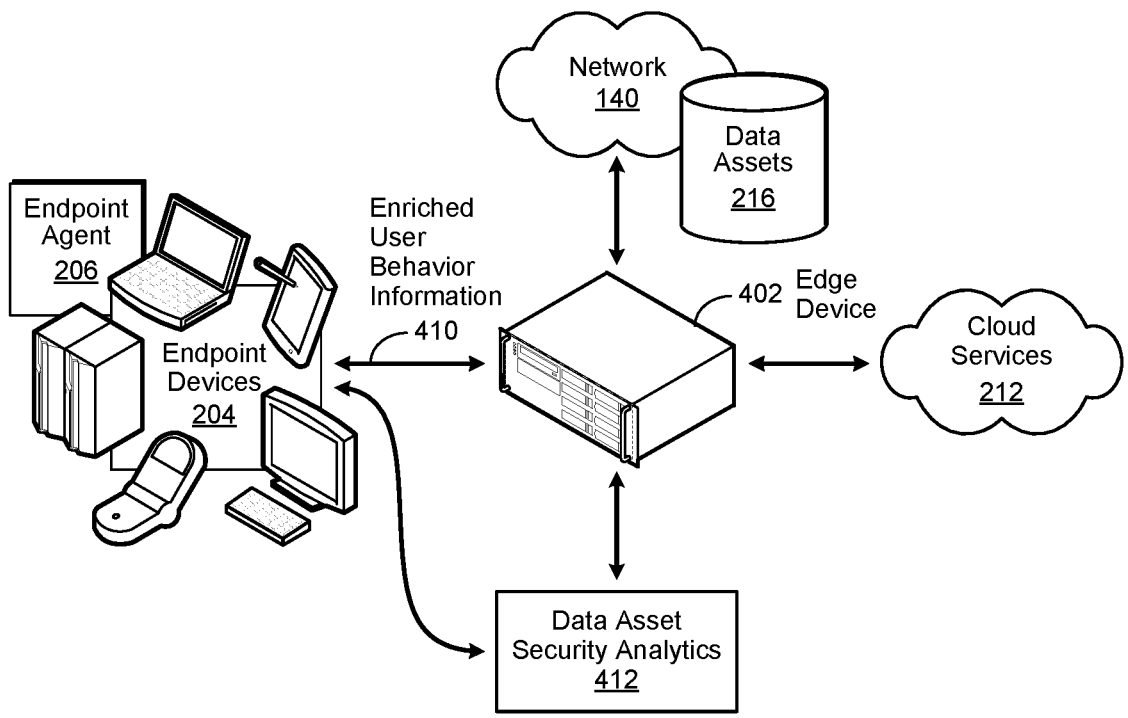
FIG. 4 is a simplified block diagram of a data asset analytics system.

FIG. 4 is a simplified block diagram of a data asset security analytics system implemented in accordance with an embodiment of the invention. In various embodiments, one or more endpoint agents 206, one or more edge devices 402, cloud services 212, and a data asset security analytics 412 system may be implemented to provide a data asset discovery security system, described in greater detail herein. In certain embodiments, the network edge device 402 may be implemented in a bridge, a firewall, or a passive monitoring configuration. In one embodiment, the edge device 402 is implemented as software running on an information processing system. In certain embodiments, the network edge device 402 may be implemented to provide integrated logging, updating and control. In certain embodiments, the edge device 402 may be implemented to receive network requests and context-sensitive cyber behavior information in the form of enriched cyber behavior information 410, described in greater detail herein, from an endpoint agent 206, likewise described in greater detail herein.

In certain embodiments, the data asset security analytics 412 system may be implemented as both a source and a sink of user behavior information. In certain embodiments, the data asset security analytics 412 system may be implemented to serve requests for user/resource risk data, track the data asset discovery security system's overall health, or a combination thereof. In certain embodiments, the edge device 402 and the endpoint agent 206, individually or in combination, may provide certain user behavior information to the data asset security analytics 412 system using either push or pull approaches familiar to skilled practitioners of the art.

As described in greater detail herein, the edge device 402 may be implemented in certain embodiments to receive enriched user behavior information 410 from the unified agent 206. It will be appreciated that such enriched user behavior information 410 will likely not be available for provision to the edge device 402 when an endpoint agent 206 is not implemented for a corresponding endpoint device 204. However, the lack of such enriched user behavior information may be accommodated in certain embodiments, albeit with reduced data asset discovery security functionality.

In certain embodiments, a given user behavior may be enriched by an associated endpoint agent 206 attaching contextual information to a network request. In one embodiment, the context may be embedded within the network request, which is then provided as enriched user behavior information 410. In another embodiment, the contextual information may be concatenated, or appended, to a network request, which in turn is provided as enriched user behavior information 410. In these embodiments, the enriched user behavior information 410 is unpacked upon receipt and parsed to separate the network request and its associated contextual information. Those of skill in the art will recognize that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 402. In these embodiments, the new flow requests are provided as enriched user behavior information 410. In various embodiments, the endpoint agent 206 may also send updated contextual information to the edge device 202 once it becomes available. As an example, an endpoint agent 206 may share a list of data assets 216 that have been access by a user, device or system at any point in time once the contextual information has been collected. To continue the example, such a list of data assets 216 may be used to determine which data asset 216 the endpoint agent 206 may be attempting to exfiltrate.

In certain embodiments, point analytics processes executing on the edge device 402 may request a particular service. As an example, risk scores on a per-user basis may be requested. In one embodiment, the service may be requested from the data asset security analytics 412 system. In another embodiment, the service may be requested from various cloud services 212.

In various embodiments, contextual information associated with a user behavior may be attached to various network service requests. In one embodiment, the request may be wrapped and then handled by proxy. In another embodiment, a small packet of contextual information associated with a user behavior may be sent with a service request. In certain embodiments, service requests may be related to Domain Name Service (DNS), web, email, and so forth, all of which are essentially requests for service by an endpoint device 204. Accordingly, such requests can be enriched by the addition of user behavior contextual information (e.g., UserAccount, interactive/automated, data-touched, etc.). As a result, the edge device 402 can then use this information to manage the appropriate response to submitted requests.

In certain embodiments, the data asset security analytics 412 system shown in FIG. 4 may be implemented in different operational configurations. In one embodiment, a data asset discovery security system, described in greater detail herein, may be implemented by using the endpoint agent 206 and the security analytics 412 system in combination. In another embodiment, a data asset discovery security system may be implemented by using the edge device 402 and the security analytics 412 system in combination. In yet another embodiment, a data asset discovery security system may be implemented by using the unified agent 206, the edge device 402, and the data asset security analytics 412 system in combination. In these embodiments, the cloud services 212 may likewise be implemented for use by the unified agent 206, the edge device 402, and the data asset security analytics 412 system, individually or in combination.

In certain embodiments, a data asset discovery security system may be implemented in an endpoint agent 206 and data asset security analytics 412 system configuration. In these embodiments, the data asset discovery behavior system may be primarily oriented to performing risk assessment operations related to user actions, program actions, data asset accesses, or a combination thereof. In certain embodiments, program actions may be treated as a proxy for the user.

In certain embodiments, the endpoint agent 206 may be implemented to update the data asset security analytics 412 system with user behavior and associated contextual information, thereby allowing an offload of certain analytics processing overhead. In one embodiment, this approach allows for longitudinal risk scoring, which assesses risk associated with certain user behavior during a particular interval of time. In another embodiment, the data asset security analytics 412 system may be implemented to access risk scores associated with the same user account, but accrued on different endpoint devices 204. It will be appreciated that such an approach may prove advantageous when an adversary is "moving sideways" through a network environment, using different endpoint devices 204 to collect information.

In certain embodiments, a data asset discovery security system may be implemented in an edge device 402 and data asset security analytics 412 system configuration. In these embodiments, the data asset security analytics 412 system may be primarily oriented to applying risk mitigations in a way that maximizes security effort return-on-investment (ROI). In certain embodiments, the approach may be accomplished by providing additional contextual and user behavior information associated with user requests. As an example, a web gateway may not concern itself with why a particular data asset 216 is being requested. Accordingly, if the data asset 216 cannot be identified as malicious or harmless, there is no context available to determine how, or if, to proceed.

To extend the example, the edge device 402 and data asset security analytics 412 system may be coupled such that requests can be contextualized and fitted into a framework that evaluates their associated risk. It will be appreciated that such an embodiment works well with web-based data loss prevention (DLP) approaches, as each transfer is no longer examined in isolation, but in the broader context of the user's actions on the network 140.

In certain embodiments, a data asset discovery security system may be implemented in an endpoint agent 206, edge device 402, and data asset security analytics 412 system configuration. In these embodiments, the data asset discovery security system may be primarily oriented to maximally leverage contextual information associated with various user behaviors within the system. In certain embodiments, data flow tracking may be performed by one or more endpoint agents 206, which allows the quantity and type of information associated with particular hosts to be measured. In turn, this information may be used determine how the edge device 402 handles requests. By contextualizing such user behavior on the network 140, the data asset discovery security system can provide intelligent protection, making decisions that make sense in the broader context of an organization's activities. It will be appreciated that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 5:
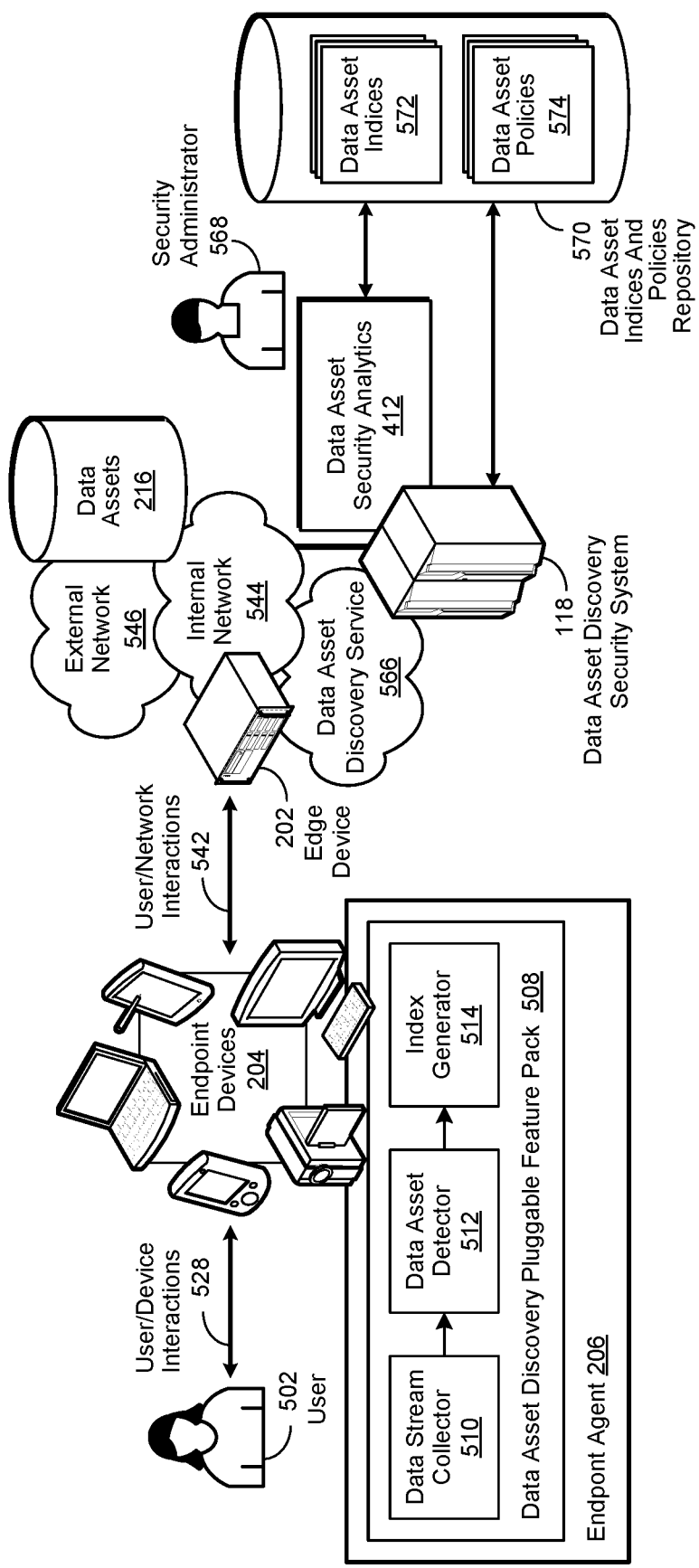
FIG. 5 is a simplified block diagram of the operation of a data asset discovery security system.

FIG. 5 is a simplified block diagram of the operation of a data asset discovery security system implemented in accordance with an embodiment of the invention. In various embodiments, a data asset discovery security system 118 is implemented to assess the risk corresponding to the occurrence of a data asset discovery operation, described in greater detail herein. In certain embodiments, the data asset discovery security system 118 may be implemented as a data asset discovery service 566. In certain embodiments, the data asset discovery security system 118 may include a data asset security analytics 412 system.

In certain embodiments, user behavior is monitored during user/device interactions 528 between the user 502 and an endpoint device 204. In certain embodiments, as described in greater detail herein, an endpoint agent 206 is implemented in combination with the endpoint device 204 to perform the user behavior monitoring. In certain embodiments, the endpoint agent 206 may be implemented to include a data asset discovery pluggable feature pack 508. In certain embodiments, the data asset discovery pluggable feature pack 508 may be further implemented to include a data stream collector 510 module, a data asset operation detector 512 module, and a data asset index generator 514 module.

In certain embodiments, the data stream collector 510 module may be implemented to capture data streams resulting from user/device interactions 528 between a user 502 and a corresponding endpoint device 204. In certain embodiments, the data stream collector 510 module may likewise be implemented to capture data streams resulting from user/network interactions 542 between an endpoint device 204 and an edge device 202 implemented on an internal network 544. In certain embodiments, the data asset operation detector 512 module may be implemented to identify the occurrence of a data asset discovery operation in the captured data streams.

In certain embodiments, the data asset operation may occur during a user/device interaction 528 with an endpoint device 204. In certain embodiments, the data asset operation may occur during a user/network interaction 542 with an edge device 202 implemented on an internal network 644. In certain embodiments, the data asset 216 associated with a given data asset discovery operation may be accessed via an internal network 544, an external network 546, or a combination thereof. In certain embodiments, the data asset index generator 514 module may be implemented to generate a new data asset index corresponding to a data asset associated with a particular data asset discovery operation.

In certain embodiments, the data asset discovery security system 118 is implemented to detect the occurrence of a data asset discovery operation (which may include a request for a data asset discovery scan). In certain embodiments, the data asset discovery operation may be performed by a user 502, a process, a device, a system, or a combination thereof. In certain embodiments, the data asset discovery scan may include a comparison of a group of data assets' 216 respective data asset indices 572 before and after the occurrence of associated data asset discovery operations. In certain embodiments, the comparison of the data asset's 216 data asset indices 572 before and after the occurrence of an associated data asset discovery operation may be performed by the data asset security analytics 412 system.

Once the occurrence of a data asset discovery operation or a request for a data asset discovery scan has been detected, an associated target data asset 216 is selected. Data asset indices 572 corresponding to the selected data asset 216 are then retrieved, followed by comparing the retrieved data asset indices 572 to existing data asset security policies 574. In certain embodiments, the data asset indices 572 and data asset security policies 574 are retrieved from a repository of data asset indices and policies 570. In certain embodiments, the data asset's 216 associated data asset indices 572 may not be available for retrieval.

A determination is then made whether existing data asset security policies 574 are applicable to the data asset's 216 associated data asset indices 572. If the data asset's 216 associated data asset indices 572 are not available for retrieval, or if they are not applicable to existing data asset security policies 574, then the selected data asset 216 is assigned to a "grey" list and conventional data asset security classification operations familiar to skilled practitioners of the art are performed. In certain embodiments, the conventional data asset security classification operations may be performed by a security administrator 568.

As used herein, a "grey" list broadly refers to a class of data asset 216 that may require further evaluation to determine whether it contains malicious content or has been compromised by a data asset discovery operation. In certain embodiments, the evaluation and any associated data asset security classification operations may be performed by a security administrator 566. Certain embodiments of the invention reflect an appreciation that the percentage of data assets 216 assigned to a "grey" list will typically be small (e.g., less than 10%).

However, if it was determined that existing data asset security policies 574 are applicable to the retrieved data asset indices 572, then data asset security analytics, described in greater detail herein, are performed on the selected data asset 216 and its associated data asset indices 572. If the results of the data asset security analytics conform to certain data asset security policies then the selected data asset 216 is assigned to a "black" list. As used herein, a "black" list broadly refers to a class of data assets 216 that conform to one or more existing data asset policies 574. In certain embodiments, a "black" list may include certain data assets 216 that do not match their respective asset indices 572, and as such, are suspect.

As an example, performance of data asset security analytics may indicate that a data asset index 572 associated with a particular data asset 216 may contain sensitive or proprietary information, which may not be allowed by certain data asset security policies 574. In certain embodiments, failure to conform to a particular data asset security policy 574 may result in the performance of additional security operations that are not based upon analysis of the data asset's 216 associated data asset indices 572. As an example, a credit manager may modify a data asset 216 associated with a particular customer, indicating the customer's credit rating has fallen below a certain threshold.

In this example, the term "credit rating" may be a sensitive term associated with a data asset security policy 574 intended to prevent malicious use of data assets 216 associated with customers. However, performance of additional security operations not based on the data asset's 216 data asset indices 572 may result in allowing the modification, as it was performed by a credit manager, who was authorized to do so. In certain embodiments, as described in further detail herein, the additional security operations may be performed by the data asset security analytics 412 system, a system administrator, or a combination thereof.

However, if it was determined that the results of the previously-performed data asset security analytics do not conform to certain data asset security policies 574, then the selected data asset 216 is assigned to a "white" list. As used herein, a "white" list broadly refers to a class of data assets 216 whose corresponding data asset indices 572 indicate they have not been modified since the occurrence of their last associated data asset discovery operation or the performance of the last data asset discovery scan. In certain embodiments, a data asset 216 assigned to a "white" list may have been modified since the occurrence of their last associated data asset discovery operation or the performance of the last data asset discovery scan, but its data asset security classification has not changed. In certain embodiments, a data asset 216 assigned to a "white" list reflects that the data asset 216 is not considered to be risky. It will be appreciated that most data assets 216 will typically be assigned to a "white" list.

From the foregoing, it will likewise be appreciated by those of skill in the art that the use of data asset indices 572 in various embodiments of the invention will likely reduce the percentage of data assets 216 requiring in-depth review and security analysis. Furthermore, implementation of certain of these embodiments may result realizing higher operational efficiency and better overall system performance. Moreover, the data asset indices 572 associated with various data assets 216 results in the generation of unique word vectors, which may prove useful for machine learning approaches familiar to skilled practitioners of the art.

Figure 6A:
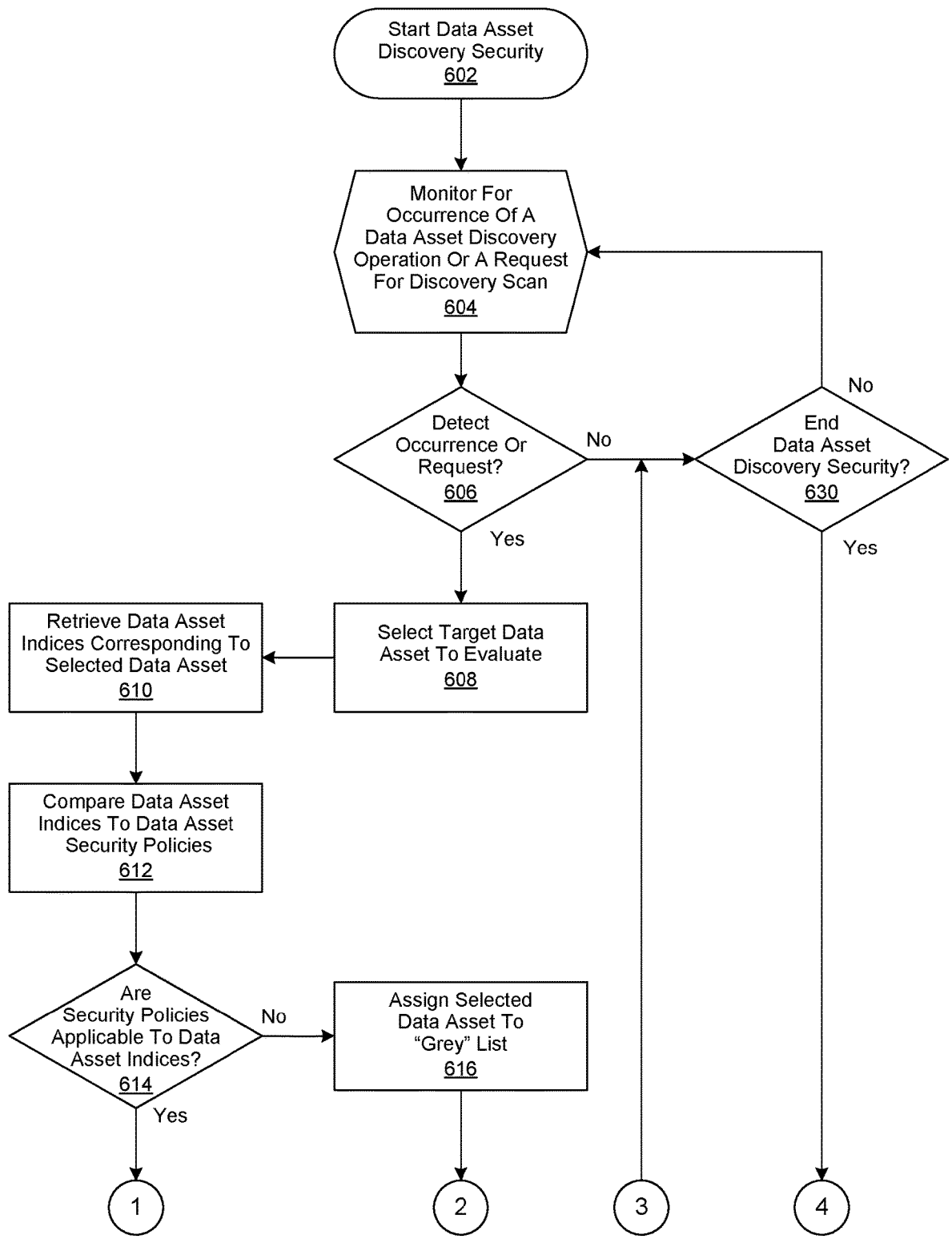
FIGS. 6a through 6b are a generalized flowchart of the performance of data asset discovery security system operations.
Figure 6B:
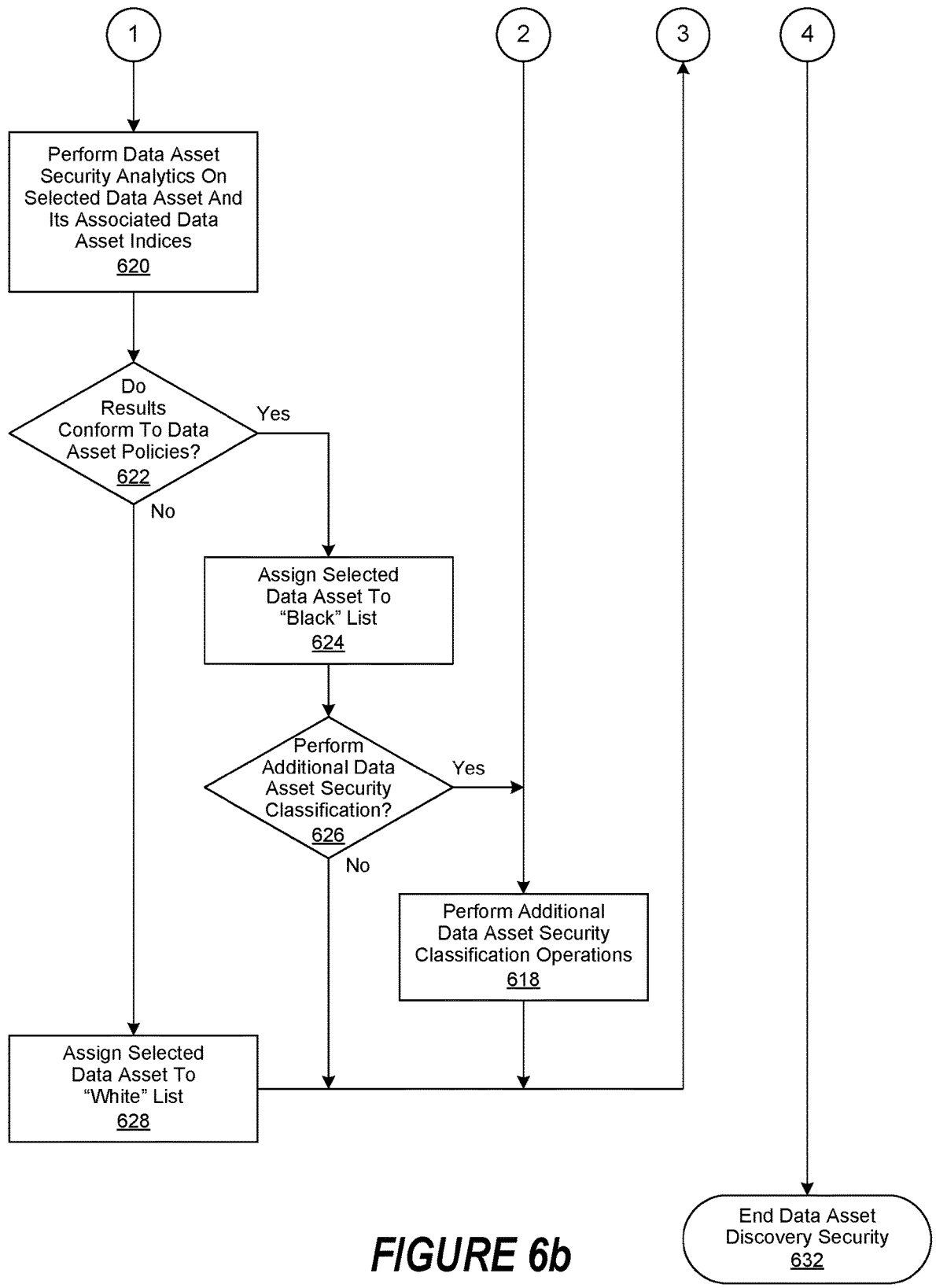

FIGS. 6a through 6b are a generalized flowchart of the performance of data asset discovery security operations implemented in accordance with an embodiment of the invention. In this embodiment, data asset discovery security operations are begun in step 602, followed by the performance of ongoing monitoring operations in step 604 to detect the occurrence of a data asset discovery operation or a request for a data asset discovery scan. In certain embodiments, the data asset discovery scan may include a comparison of a particular data asset's data asset indices before and after the occurrence of an associated data asset discovery operation. In certain embodiments, the data asset discovery scan may include a comparison of a group of data assets' respective data asset indices before and after the occurrence of associated data asset discovery operations.

A determination is then made in step 606 whether the occurrence of a data asset discovery operation or a request for a data asset discovery scan has been detected. If not, then a determination is made in step 630 whether to end data asset discovery operations. If not, then the process is continued, proceeding with step 604. Otherwise data asset discovery operations are ended in step 632.

However, if it was determined in step 606 that the occurrence of a data asset discovery operation or a request for a data asset discovery scan has been detected, then a target data asset is selected in step 608. Data asset indices corresponding to the selected data asset are then retrieved in in step 610, followed by comparing the retrieved data asset indices to existing data asset security policies in step 612. A determination is then made in step 614 whether existing data asset security policies are applicable to the retrieved data asset indices. If not, then the selected data asset is assigned to a "grey" list and conventional data asset security classification operations familiar to those of skill in the art are performed in step 618. In certain embodiments, the conventional data asset security classification operations may be performed by a security administrator.

However, if it was determined in step 614 that data asset security policies are applicable to the retrieved data asset indices, then data asset security analytics, described in greater detail herein, are performed on the selected data asset and its associated data asset indices in step 620. A determination is then made in step 622 whether the results of the data asset security analytics conform to certain data asset security policies.

If so, then the selected data asset is assigned to a "black" list in step 624, followed by a determination being made in step 626 whether to perform additional data asset security classification operations. If so, then additional data asset security classification operations, familiar to those of skill in the art, are performed in step 618. However, if it was determined in step 622 that the results of the data asset security analytics performed in step 620 do not conform to certain data asset security policies, then the selected data asset is assigned to a "white" list in step 628. Thereafter, or if it was determined in step 626 to not perform additional data asset security classification operations, or if such data asset security classification operations were performed in step 618, the process is continued, proceeding with step 630.

Although the present invention has been described in detail, it should be understood that various changes, substitutions and alterations can be made hereto without departing from the spirit and scope of the invention as defined by the appended claims.

What is claimed is:

1. A computer-implementable method for performing a data asset discovery security operation, comprising:
capturing a stream of data resulting from interactions between a user and a device;
identifying an occurrence of a data asset discovery operation in the stream of data;
generating a data asset index corresponding to a data asset associated with the occurrence of the data asset discovery operation; and,
determining whether a data asset security policy is applicable to the data asset associated with the occurrence of the data asset discovery operation; and wherein
the capturing, the identifying, the generating and the determining are performed by an endpoint agent executing on an endpoint device, the endpoint agent comprising a data asset discovery feature pack, the data asset discovery feature pack being a pluggable feature pack, the pluggable feature pack being invoked as needed by the endpoint agent to provide data asset discovery functionality, the endpoint agent being used in combination with the endpoint device to establish a protected endpoint, the protected endpoint providing a policy-based approach to network security, the policy-based approach requiring the endpoint device to comply with particular criteria when accessing a data asset.

2. The method of claim 1, further comprising:
associating the data asset with a further evaluation data asset class when the data asset associated with the occurrence is not applicable to the data asset security policy, the further evaluation data asset class indicating that the data asset discovery operation may require further evaluation.

3. The method of claim 2, further comprising:
associating the data asset with a failure data asset class when the data asset associated with the occurrence is applicable to the data asset security policy, the failure data asset class indicating that the data asset discovery operation fails to conform to an existing data asset policy.

4. The method of claim 3, further comprising:
performing additional data asset security classification operations when the data asset is associated with one of the further evaluation data asset class and the failure data asset class.

5. The method of claim 1, further comprising:
associating the data asset with a conform data asset class when the data asset associated with the occurrence conforms to the data asset security policy, the conform data asset class indicating that the data asset discovery operation conforms to an existing data asset policy.

6. The method of claim 1, wherein:
the data assets feature pack comprises a data stream collector, a data asset detector and an index generator, the data stream collector being implemented to capture data streams resulting from user/device interactions between the user and the endpoint device, the data asset collector being implemented to identify an occurrence of a data asset discover operation in the data streams from user/device interactions, the index generator being implemented to generate a data asset index corresponding to a data asset associated with a particular data asset discover operation.

7. A system comprising:
a processor;
a data bus coupled to the processor; and
a non-transitory, computer-readable storage medium embodying computer program code for performing a data asset discovery security operation, the non-transitory, computer-readable storage medium being coupled to the data bus, the computer program code interacting with a plurality of computer operations and comprising instructions executable by the processor and configured for:
capturing a stream of data resulting from interactions between a user and a device;

identifying an occurrence of a data asset discovery operation in the stream of data;

generating a data asset index corresponding to a data asset associated with the occurrence of the data asset discovery operation; and, determining whether a data asset security policy is applicable to the data asset associated with the occurrence of the data asset discovery operation; and wherein the capturing, the identifying, the generating and the determining are performed by an endpoint agent executing on an endpoint device, the endpoint agent comprising a data asset discovery feature pack, the data asset discovery feature pack being a pluggable feature pack, the pluggable feature pack being invoked as needed by the endpoint agent to provide data asset discovery functionality, the endpoint agent being used in combination with the endpoint device to establish a protected endpoint, the protected endpoint providing a policy-based approach to network security, the policy-based approach requiring the endpoint device to comply with particular criteria when accessing a data asset.

8. The system of claim 7, wherein the instructions are further configured for:

associating the data asset with a further evaluation data asset class when the data asset associated with the occurrence is not applicable to the data asset security policy, the further evaluation data asset class indicating that the data asset discovery operation may require further evaluation.

9. The system of claim 8, wherein the instructions are further configured for:

associating the data asset with a failure data asset class when the data asset associated with the occurrence is applicable to the data asset security policy, the failure data asset class indicating that the data asset discovery operation fails to conform to an existing data asset policy.

10. The system of claim 9, wherein the instructions are further configured for:

performing additional data asset security classification operations when the data asset is associated with one of the further evaluation data asset class and the failure data asset class.

11. The system of claim 7, wherein the instructions are further configured for associating the data asset with a conform data asset class when the data asset associated with the occurrence conforms to the data asset security policy, the conform data asset class indicating that the data asset discovery operation conforms to an existing data asset policy.

12. The system of claim 7, wherein:

the data assets feature pack comprises a data stream collector, a data asset detector and an index generator, the data stream collector being implemented to capture data streams resulting from user/device interactions between the user and the endpoint device, the data asset collector being implemented to identify an occurrence of a data asset discover operation in the data streams from user/device interactions, the index generator being implemented to generate a data asset index corresponding to a data asset associated with a particular data asset discover operation.

13. A non-transitory, computer-readable storage medium embodying computer program code for performing a data asset discovery security operation, the computer program code comprising computer executable instructions configured for:

capturing a stream of data resulting from interactions between a user and a device;

identifying an occurrence of a data asset discovery operation in the stream of data;

generating a data asset index corresponding to a data asset associated with the occurrence of the data asset discovery operation; and, determining whether a data asset security policy is applicable to the data asset associated with the occurrence of the data asset discovery operation; and wherein the capturing, the identifying, the generating and the determining are performed by an endpoint agent executing on an endpoint device, the endpoint agent comprising a data asset discovery feature pack, the data asset discovery feature pack being a pluggable feature pack, the pluggable feature pack being invoked as needed by the endpoint agent to provide data asset discovery functionality, the endpoint agent being used in combination with the endpoint device to establish a protected endpoint, the protected endpoint providing a policy-based approach to network security, the policy-based approach requiring the endpoint device to comply with particular criteria when accessing a data asset.

14. The non-transitory, computer-readable storage medium of claim 13, wherein the computer executable instructions are further configured for:

associating the data asset with a further evaluation data asset class when the data asset associated with the occurrence is not applicable to the data asset security policy, the further evaluation data asset class indicating that the data asset discovery operation may require further evaluation.

15. The non-transitory, computer-readable storage medium of claim 14, wherein the computer executable instructions are further configured for:

associating the data asset with a failure data asset class when the data asset associated with the occurrence is applicable to the data asset security policy, the failure data asset class indicating that the data asset discovery operation fails to conform to an existing data asset policy.

16. The non-transitory, computer-readable storage medium of claim 15, wherein the computer executable instructions are further configured for:

performing additional data asset security classification operations when the data asset is associated with one of the further evaluation data asset class and the failure data asset class.

17. The non-transitory, computer-readable storage medium of claim 13, wherein the computer executable instructions are further configured for:

associating the data asset with a conform data asset class when the data asset associated with the occurrence conforms to the data asset security policy, the conform data asset class indicating that the data asset discovery operation conforms to an existing data asset policy.

18. The non-transitory, computer-readable storage medium of claim 13, wherein:

the data assets feature pack comprises a data stream collector, a data asset detector and an index generator, the data stream collector being implemented to capture data streams resulting from user/device interactions between the user and the endpoint device, the data asset collector being implemented to identify an occurrence of a data asset discover operation in the data streams from user/device interactions, the index generator being implemented to generate a data asset index corresponding to a data asset associated with a particular data asset discover operation.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

\* \* \* \* \*